(12) United States Patent
Chen et al.

(10) Patent No.: US 11,031,586 B2
(45) Date of Patent: Jun. 8, 2021

(54) METHODS FOR MANUFACTURING SULFUR ELECTRODES

(71) Applicant: GM GLOBAL TECHNOLOGY OPERATIONS LLC, Detroit, MI (US)

(72) Inventors: Shuru Chen, Troy, MI (US); Hongliang Wang, Sterling Heights, MI (US); Fang Dai, Troy, MI (US); Meinan He, Sterling Heights, MI (US); Mei Cai, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 168 days.

(21) Appl. No.: 16/221,874

(22) Filed: Dec. 17, 2018

(65) Prior Publication Data

US 2020/0194777 A1 Jun. 18, 2020

(51) Int. Cl.
*H01M 4/1393* (2010.01)
*H01M 4/1397* (2010.01)
*H01M 4/136* (2010.01)
*H01M 4/62* (2006.01)
*H01M 4/133* (2010.01)
*H01M 4/02* (2006.01)

(52) U.S. Cl.
CPC ......... *H01M 4/1393* (2013.01); *H01M 4/133* (2013.01); *H01M 4/136* (2013.01); *H01M 4/1397* (2013.01); *H01M 4/623* (2013.01); *H01M 2004/028* (2013.01)

(58) Field of Classification Search
CPC .. H01M 4/1393; H01M 4/1397; H01M 4/136; H01M 4/623; H01M 4/133; H01M 2004/028; H01M 10/052; H01M 4/5815; H01M 4/0404; H01M 2004/021; H01M 4/38; H01M 4/625; H01M 4/13; H01M 4/139; Y02E 60/10
USPC ....................................... 429/231.8
See application file for complete search history.

(56) References Cited

U.S. PATENT DOCUMENTS

2018/0316020 A1* 11/2018 Pfleging ............. B23K 26/0624

* cited by examiner

*Primary Examiner* — Gary D Harris
(74) *Attorney, Agent, or Firm* — Quinn IP Law

(57) ABSTRACT

Methods for manufacturing sulfur electrodes include providing an electrode, wherein the electrode includes a current collector having a first surface, and a sulfur-based host material applied to the first surface of the current collector, wherein the sulfur-based host material comprises one or more sulfur compounds, one or more electrically conductive carbon materials, and one or more binders. The methods further include forming a plurality of channels within the sulfur-based host material using a laser or electron beam, wherein the plurality of channels define a plurality of host material columns, each column having one or more exterior surfaces contiguous which one or more of the channels which extend outward from the first surface of the current collector. Each of the one or more exterior surfaces can define a heat affected zone comprising a higher concentration of sulfur than the host material column prior to forming the plurality of channels.

20 Claims, 3 Drawing Sheets

METHODS FOR MANUFACTURING SULFUR ELECTRODES

INTRODUCTION

Lithium-sulfur batteries describe a class of rechargeable batteries in which lithium ions move between a negative electrode (i.e., anode) and a positive electrode (i.e., cathode). Liquid, solid, and polymer electrolytes can facilitate the movement of lithium ions between the anode and cathode. Lithium-sulfur batteries are growing in popularity for defense, automotive, and aerospace applications due to their high energy density and ability to undergo successive charge and discharge cycles.

SUMMARY

Methods for manufacturing sulfur electrodes are provided, and include providing an electrode, having a current collector with a first surface and a sulfur-based host material applied to the first surface of the current collector, and forming a plurality of channels within the sulfur-based host material using a laser or electron beam, wherein the plurality of channels define a plurality of host material columns, each column having one or more exterior surfaces contiguous which one or more of the channels which extend outward from the first surface of the current collector. The sulfur-based host material can include one or more sulfur compounds, one or more electrically conductive carbon materials, and one or more binders. Forming a plurality of channels can include forming a plurality of intersecting channels. The plurality of host material columns can have an average current collector footprint diameter on the first surface of the current collector of less than about 1 millimeter. The plurality of channels can have an average thickness of less than about 100 micrometers. Each of the one or more exterior surfaces of each of the plurality of host material columns can define a heat affected zone which extends inward from the respective exterior surface and comprises a higher concentration of sulfur than the average concentration of sulfur of the respective host material column prior to forming the plurality of channels. Forming a plurality of channels can include forming a plurality of channels which extend from a top surface of the sulfur-based host material to the first surface of the current collector. The host material of the sulfur electrode can have a porosity of less than about 55%. The one or more sulfur compounds can include sulfur, $S_8$, $Li_2S_8$, $Li_2S_6$, $Li_2S_4$, $Li_2S_2$, or $Li_2S$, and combinations thereof. The one or more electrically conductive carbon materials can include conductive carbon black, high surface area carbon, such as acetylene black or activated carbon, graphite, carbon nanotubes, carbon nanofiber, graphene, or vapor growth carbon fiber (VGCF), and combinations thereof. The host material can include about 45% to about 80% sulfur compounds, about 9% to about 45% electrically conductive carbon, and about 2% to about 10% binders.

Methods for manufacturing sulfur cathodes are provided, and include applying a sulfur-based host material to a first surface of a current collector, wherein the sulfur-based host material comprises one or more sulfur compounds, one or more electrically conductive carbon materials, and one or more binders, forming a plurality of channels within the sulfur-based host material using a laser or electron beam, wherein the plurality of channels define a plurality of host material columns, each column having one or more exterior surfaces contiguous which one or more of the channels which extend outward from and are substantially normal to the first surface of the current collector; and trimming the current collector. Applying the sulfur-based host material to the first surface of the current collector can include forming an host material slurry, applying the host material slurry to the first surface of the current collector, and solidifying the host material slurry. The methods can further include applying the sulfur-based host material to a second surface of the current collector. Forming a plurality of channels can include forming a plurality of intersecting channels. The plurality of host material columns can have an average current collector footprint diameter on the first surface of the current collector of less than about 1 millimeter. The plurality of channels can have an average thickness of less than about 100 micrometers. Each of the one or more exterior surfaces of each of the plurality of host material columns can define a heat affected zone which extends inward from the respective exterior surface and comprises a higher concentration of sulfur than the average concentration of sulfur of the respective host material column prior to forming the plurality of channels. Forming a plurality of channels can include forming a plurality of channels which extend from a top surface of the sulfur-based host material to the first surface of the current collector. The one or more electrically conductive carbon materials can include conductive carbon black, high surface area carbon, such as acetylene black or activated carbon, graphite, carbon nanotubes, carbon nanofiber, graphene, or vapor growth carbon fiber, and combinations thereof. The host material can include about 45% to about 80% sulfur compounds, about 9% to about 45% electrically conductive carbon, and about 2% to about 10% binders.

Other objects, advantages and novel features of the exemplary embodiments will become more apparent from the following detailed description of exemplary embodiments and the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Provided herein are methods for manufacturing sulfur electrodes. The methods provided herein increase the surface area of electrode host materials and the preferential migration of sulfur therein, thereby increasing the energy density of electrochemical cells utilizing the electrodes.

Figure 1:
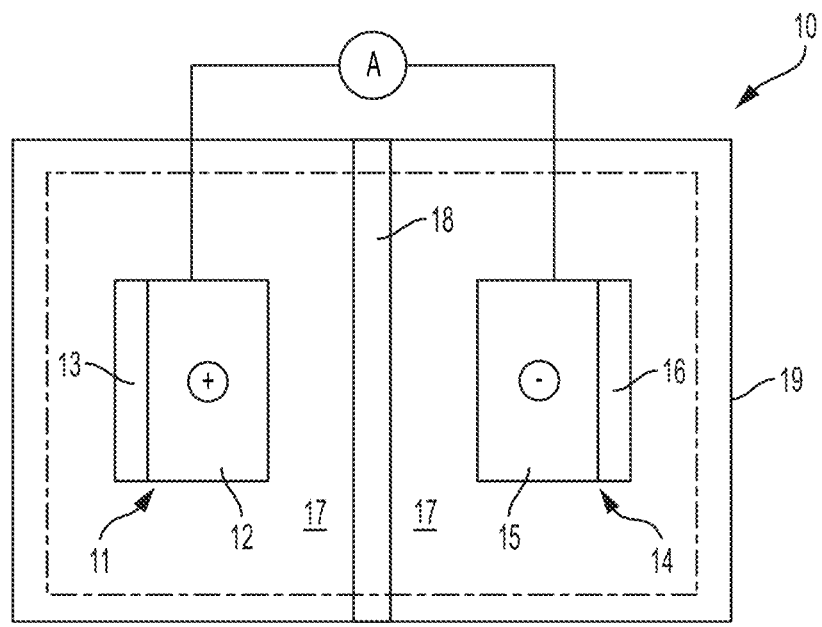
FIG. 1 illustrates a lithium-sulfur battery cell, according to one or more embodiments.

FIG. 1 illustrates a lithium-sulfur battery cell 10 comprising a positive electrode (i.e., the cathode) 11, a negative electrode (i.e., the anode) 14, an electrolyte 17 operatively disposed between the cathode 11 and the anode 14, and a separator 18. Cathode 11, anode 14, and electrolyte 17 can be encapsulated in container 19, which can be a hard (e.g., metallic) case or soft (e.g., polymer) pouch, for example. The cathode 11 and anode 14 are situated on opposite sides of separator 18 which can comprise a microporous polymer or other suitable material capable of conducting lithium ions and optionally electrolyte (i.e., liquid electrolyte). Electrolyte 17 is a liquid electrolyte comprising one or more lithium salts dissolved in a non-aqueous solvent. Anode 14 generally includes a current collector 15 and a lithium active material 16 (e.g., a lithium alloy, metallic lithium, etc.) applied thereto. Cathode 11 generally includes a current collector 12 and a sulfur-based host material 13 applied thereto.

Active material 16 can store lithium ions at a lower electric potential than host material 13, for example. The current collectors 12 and 15 associated with the two electrodes are connected by an interruptible external circuit that allows an electric current to pass between the electrodes to electrically balance the related migration of lithium ions. Although FIG. 1 illustrates host material 13 and active material 16 schematically for the sake of clarity, host material 13 and active material 16 can comprise an exclusive interface between the cathode 11 and anode 14, respectively, and electrolyte 17.

Figure 2:
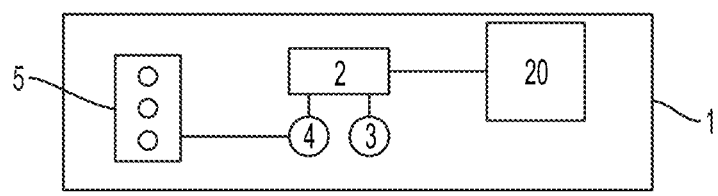
FIG. 2 illustrates a schematic diagram of a hybrid-electric vehicle, according to one or more embodiments.

Battery cell 10 can be used in any number of applications. For example, FIG. 2 illustrates a schematic diagram of a hybrid-electric vehicle 1 including a battery pack 20 and related components. A battery pack such as the battery pack 20 can include a plurality of battery cells 10. A plurality of battery cells 10 can be connected in parallel to form a group, and a plurality of groups can be connected in series, for example. One of skill in the art will understand that any number of battery cell connection configurations are practicable utilizing the battery cell architectures herein disclosed, and will further recognize that vehicular applications are not limited to the vehicle architecture as described. Battery pack 20 can provide energy to a traction inverter 2 which converts the direct current (DC) battery voltage to a three-phase alternating current (AC) signal which is used by a drive motor 3 to propel the vehicle 1. An engine 5 can be used to drive a generator 4, which in turn can provide energy to recharge the battery pack 20 via the inverter 2. External (e.g., grid) power can also be used to recharge the battery pack 20 via additional circuitry (not shown). Engine 5 can comprise a gasoline or diesel engine, for example.

Battery cell 10 generally operates by reversibly passing lithium ions between cathode 11 and anode 14. Lithium ions move from anode 14 to cathode 11 while discharging, and move from cathode 11 to anode 14 while charging. At the beginning of a discharge, anode 14 contains a high concentration of intercalated/alloyed lithium ions while cathode 11 is relatively depleted, and establishing a closed external circuit between cathode 11 and anode 14 under such circumstances causes intercalated/alloyed lithium ions to be extracted from anode 14. The extracted lithium atoms are split into lithium ions and electrons as they leave an intercalation/alloying host at an electrode-electrolyte interface. The lithium ions are carried through the micropores of separator 18 from anode 14 to cathode 11 by the ionically conductive electrolyte 17 while, at the same time, the electrons are transmitted through the external circuit from cathode 11 to anode 14 to balance the overall electrochemical cell. This flow of electrons through the external circuit can be harnessed and fed to a load device until the level of intercalated/alloyed lithium in the negative electrode falls below a workable level or the need for power ceases.

Battery cell 10 may be recharged after a partial or full discharge of its available capacity. To charge or re-power the lithium-sulfur battery cell, an external power source (not shown) is connected to the positive and the negative electrodes to drive the reverse of battery discharge electrochemical reactions. That is, during charging, the external power source extracts the lithium ions present in cathode 11 to produce lithium ions and electrons. The lithium ions are carried back through the separator by the electrolyte solution, and the electrons are driven back through the external circuit, both towards anode 14. The lithium ions and electrons are ultimately reunited at the negative electrode, thus replenishing it with intercalated/alloyed/metallic lithium for future battery cell discharge.

Lithium-sulfur battery cell 10, or a battery module or pack comprising a plurality of battery cells 10 connected in series and/or in parallel, can be utilized to reversibly supply power and energy to an associated load device. Lithium-sulfur batteries may also be used in various consumer electronic devices (e.g., laptop computers, cameras, and cellular/smart phones), military electronics (e.g., radios, mine detectors, and thermal weapons), aircrafts, and satellites, among others. Lithium-sulfur batteries, modules, and packs may be incorporated in a vehicle such as a hybrid electric vehicle (HEV), a battery electric vehicle (BEV), a plug-in HEV, or an extended-range electric vehicle (EREV) to generate enough power and energy to operate one or more systems of the vehicle. For instance, the battery cells, modules, and packs may be used in combination with a gasoline or diesel internal combustion engine to propel the vehicle (such as in hybrid electric vehicles), or may be used alone to propel the vehicle (such as in battery powered vehicles).

Returning to FIG. 1, electrolyte 17 conducts lithium ions between cathode 11 and anode 14, for example during charging or discharging the battery cell 10. The electrolyte 17 comprises one or more solvents, and one or more lithium salts dissolved in the one or more solvents. Suitable solvents can include cyclic carbonates (ethylene carbonate, propylene carbonate, butylene carbonate), acyclic carbonates (dimethyl carbonate, diethyl carbonate, ethylmethylcarbonate), aliphatic carboxylic esters (methyl formate, methyl acetate, methyl propionate), γ-lactones (γ-butyrolactone, γ-valerolactone), chain structure ethers (1,3-dimethoxypropane, 1,2-dimethoxyethane (DME), 1-2-diethoxyethane, ethoxymethoxyethane), cyclic ethers (tetrahydrofuran, 2-methyltetrahydrofuran, 1,3-dioxolane), and combinations thereof. A non-limiting list of lithium salts that can be dissolved in the organic solvent(s) to form the non-aqueous liquid electrolyte solution include $LiClO_4$, $LiAlCl_4$, LiI, LiBr, LiSCN, $LiBF_4$, $LiB(C_6H_5)_4 LiAsF_6$, $LiCF_3SO_3$, $LiN(CF_3SO_2)_2$, $LiN(FSO_2)_2$, $LiPF_6$, and mixtures thereof.

The microporous polymer separator 18 can comprise, in one embodiment, a polyolefin. The polyolefin can be a homopolymer (derived from a single monomer constituent) or a heteropolymer (derived from more than one monomer constituent), either linear or branched. If a heteropolymer derived from two monomer constituents is employed, the polyolefin can assume any copolymer chain arrangement including those of a block copolymer or a random copolymer. The same holds true if the polyolefin is a heteropolymer derived from more than two monomer constituents. In one embodiment, the polyolefin can be polyethylene (PE), polypropylene (PP), or a blend of PE and PP. The microporous polymer separator 18 may also comprise other polymers in addition to the polyolefin such as, but not limited to, polyethylene terephthalate (PET), polyvinylidene fluoride (PVdF), and or a polyamide (Nylon). Separator 18 can optionally be ceramic-coated with materials including one or more of ceramic type aluminum oxide (e.g., $Al_2O_3$), and lithiated zeolite-type oxides, among others. Lithiated zeolite-type oxides can enhance the safety and cycle life performance of lithium-sulfur batteries, such as battery cell 10. Skilled artisans will undoubtedly know and understand the many available polymers and commercial products from which the microporous polymer separator 18 may be fabricated, as well as the many manufacturing methods that may be employed to produce the microporous polymer separator 18.

The anode current collector 15 can include copper, nickel, stainless steel, or any other appropriate electrically conductive material known to skilled artisans. Anode current collector 15 can be treated (e.g., coated) with highly electrically conductive materials, including one or more of conductive carbon black, graphite, carbon nanotubes, carbon nanofiber, graphene, and vapor growth carbon fiber (VGCF), among others. The active material 16 applied to the anode current collector 15 can include any lithium active material that can sufficiently undergo lithium ion intercalation/deintercalation or alloying/de-alloying, while functioning as the negative terminal of the lithium-sulfur battery 10. Active material 16 can optionally further include a polymer binder material to structurally hold the lithium host material together. For example, in one embodiment, active material 16 can further include a carbonaceous material (e.g., graphite) and/or one or more of binders (e.g., polyvinyldiene fluoride (PVdF), an ethylene propylene diene monomer (EPDM) rubber, carboxymethoxyl cellulose (CMC), and styrene, 1,3-butadiene polymer (SBR)). Examples of suitable active materials are known in the art.

Host material 13 comprises a sulfur-based host material, typically in the form of a porous sulfur-carbon matrix composite, and generally includes one or more sulfur compounds, electrically conductive carbon, and a binder, such as a polymer binder material, to structurally hold the host material 13 together. In some embodiments, host material 13 can comprise about 45% to about 80% sulfur compounds, about 9% to about 45% electrically conductive carbon, and about 2% to about 10% binders. The cathode current collector 12 can include aluminum or any other appropriate electrically conductive material known to skilled artisans, and can be formed in a foil or grid shape, for example. Cathode current collector 12 can be treated (e.g., coated) with highly electrically conductive materials, including one or more of conductive carbon black, graphite, carbon nanotubes, carbon nanofiber, graphene, and vapor growth carbon fiber (VGCF), among others. Sulfur compounds suitable for use as host material 13 can comprise $S_8$, $Li_2S_8$, $Li_2S_6$, $Li_2S_4$, $Li_2S_2$, $Li_2S$, and combinations thereof. The electrically conductive carbon can comprise conductive carbon black, high surface area carbon, such as acetylene black or activated carbon, graphite, carbon nanotubes, carbon nanofiber, graphene, vapor growth carbon fiber (VGCF), and combinations thereof, among others. The host material 13 can comprise a porosity of less than about 60%, less than about 55%, or less than about 50%, for example. The host material 13 can be prepared by mixing the one or more sulfur compounds and electrically conductive carbon, and subsequently heat-treating the mixture at a temperature of about 130° C. to about 180° C.

Suitable binders include polyvinylidene fluoride (PVDF), polyethylene oxide (PEO), an ethylene propylene diene monomer (EPDM) rubber, carboxymethyl cellulose (CMC)), styrene-butadiene rubber (SBR), styrene-butadiene rubber carboxymethyl cellulose (SBR-CMC), polyacrylic acid (PAA), cross-linked polyacrylic acid-polyethylenimine, polyimide, or any other suitable binder material known to skilled artisans. Other suitable binders include polyvinyl alcohol (PVA), sodium alginate, or other water-soluble binders. The polymer binder structurally holds the one or more sulfur compounds and the electrically conductive carbon together.

Figure 3:
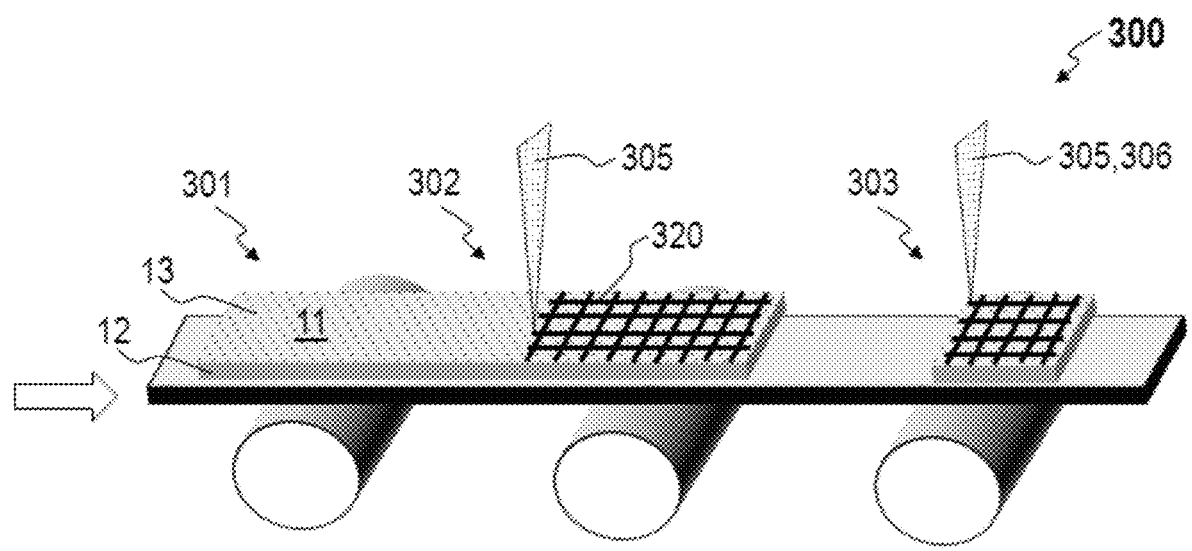
FIG. 3 illustrates a schematic of a method for manufacturing sulfur electrodes, according to one or more embodiments.

FIG. 3 illustrates a schematic of a method 300 for manufacturing sulfur electrodes. Method 300 advantageously increases the macro-surface area of the host material of an electrode, and the utilization of the sulfur-based host material, and accordingly increases the energy density of a cell (e.g., lithium-sulfur cell 10) into which the electrode is integrated. Further, method 300 increases the sulfur concentration at some electrolyte 17 interfaces, as will be described below. Method 300 comprises providing 301 an electrode 11 comprising a currently collector 12 and a sulfur-based host material 13 applied thereto, forming 302 a plurality of channels 320 within the sulfur-based host material 13, and optionally trimming 303 the current collector 12. As described above, the sulfur-based host material 13 comprises one or more sulfur compounds, one or more electrically conductive carbon materials, and one or more binders. The plurality of channels 320 are formed 302 using an energy source 305, such as an electron beam or a laser. The current collector 12 can be trimmed 303 using an energy source 305, or by various other means 306, such as a mechanical trimmer. Trimming 303 can occur before forming 302 the plurality of channels 320, or after forming 302 the plurality of channels.

Providing 301 an electrode 11 can comprise providing an electrode 11 with host material 13 applied to a first side 121 and optionally a second side 122 of the current collector. Accordingly, forming 302 a plurality of channels 320 within the sulfur-based host material 13 can include forming 302 a plurality of channels 320 within the sulfur-based host material 13 applied to the first side 121 of the current collector 12 and optionally the second side 122 of the current collector 12. Providing 301 an electrode 11 can comprise applying a sulfur-based host material 13 to the first surface 121 of the current collector 12 and optionally the second side 122 of the current collector 12. In some embodiments, applying the sulfur-based host material 13 to the first surface 121, optionally the second surface 122, of the current collector 12 can comprise forming a host material 13 slurry, applying the host material 13 slurry to the first surface 121, and optionally the second surface 122, of the current collector 12, and solidifying the host material 13 slurry. The host material slurry can comprise the one or more sulfur compounds described above, the one or more electrically conductive carbon materials described above, and the one or more binders described above. Solidifying the slurry can comprise drying, baking, curing, or otherwise hardening the slurry to form a host material 13 adhered to the first surface 121, and optionally the second surface 122, of the current collector 12.

Figure 4:
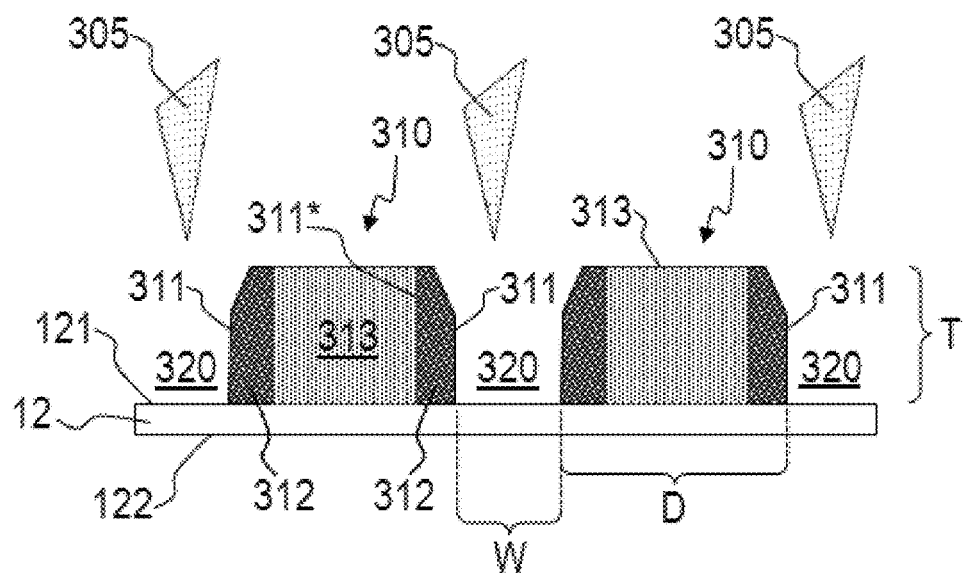
FIG. 4 illustrates a schematic side-view of a plurality of host material columns formed on a current collector, according to one or more embodiments.

In many embodiments, forming 302 a plurality of channels 320 comprises forming a plurality of intersecting channels 320. For example, the channels 320 shown in FIG. 3 are formed in a grid pattern. The plurality of channels 320 define a plurality of host material columns 310, such as the two host material columns 310 illustrated in FIG. 4. Each column 310 includes one or more exterior surfaces 311 contiguous which one or more of the channels 320 which extend outward from a first surface 121 of the current collector 12. In some embodiments, the exterior surfaces are substantially normal to the first surface 121 of the current collector 12. The plurality of channels can extend from a top surface 131 of the host material 13 to the current collector 12, as shown in FIG. 4. Alternatively, the plurality of channels can extend from a top surface 131 of the host material 13 toward the current collector 12 for a depth which is less than the thickness T of the host material 13.

As a result of utilizing the energy source(s) 305 to form 302 the plurality of channels 320, each of the exterior surfaces 311 contiguous which one or more of the channels 320 defines a heat affected zone (HAZ) 312 which extends inward from the respective exterior surface 311. Each HAZ 312 comprises a higher concentration of sulfur than the average concentration of sulfur of the respective host material column 310 prior to forming 302 the plurality of channels 320. In some embodiments, the concentration of sulfur can be highest at each of the exterior surfaces 311 and gradually decrease throughout the HAZ 12 towards a central region 313 of the column 310. Accordingly, the concentration of sulfur at an inner side 311* of a HAZ can be substantially equal to the concentration of sulfur in the central region 313.

The width W of the channels 320 can be determined based on the energy source used, or can be tuned to a particular need. In general, a channel 320 width W is ideally narrow, yet sufficiently wide to allow electrolyte 17 to access the surfaces of the host material columns 310. For example, the width W of one or more channels 320, or the average thickness of all channels 320, can be about 10 nm to about 100 nm. In some embodiments, the width W of one or more channels 320, or the average thickness of all channels 320, can be about 100 nm to about 100 μm. The plurality of host material columns 310 can be characterized by an average current collector footprint diameter D. In some embodiments, the average footprint diameter D can be less than about 1.2 mm, less than about 1.1 mm, or less than about 1.0 mm. In some embodiments, the average footprint diameter D can be about 0.1 mm to about 1 mm. For example, the channels 320 can form a grid pattern defining an array of host material columns 310 having quadrilateral-shaped footprints with an average footprint diameter of about 0.4 mm to about 0.6 mm, or about 0.5 mm.

Example 1

Figure 5:
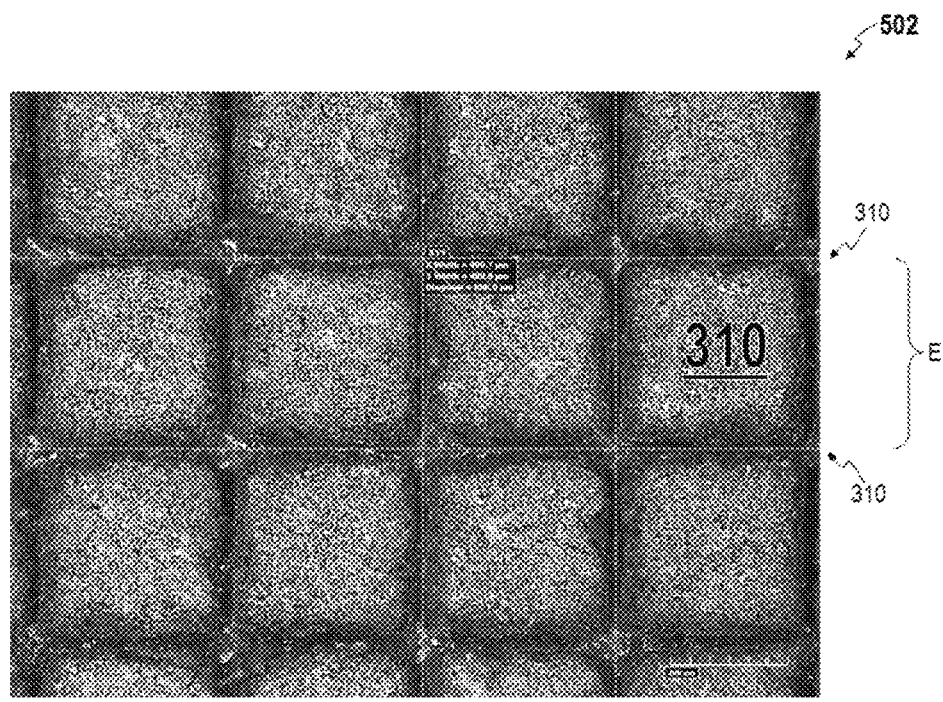
FIG. 5 illustrates a microscopic top view of a patterned electrode, according to one or more embodiments.

Two sulfur electrodes were formed by applying a slurry to a first aluminum current collector, and a second aluminum current collector. Each current collector had a thickness of 20 μm. The slurry comprised 85% carbon-sulfur composite comprising 77% sulfur, 10% conductive carbon black, and 5% CMC binder. The sulfur-carbon composite was prepared by mixing sulfur and conductive mesoporous carbon at a 77:23 sulfur:carbon ratio, and subsequently heat treating the slurry at 160° C. for 10 hours. The resulting carbon-sulfur composite was then mixed with conductive carbon black and a binder solution to form a slurry. The slurry was applied to each current collector to form a sulfur-based host material on each current collector. The host material on each current collector was then calendared to a coating thickness of about 80 μm. The second sulfur electrode was laser patterned using a 10 W, 1064 nm wavelength laser with a 43 μm spot size, at a scan speed of 75 mm/s, a repetition rate of 50 kHz, and a pulse width of 240 ns. The first, un-patterned electrode had a host material loading of about 8 mg/cm$^2$, and the second patterned electrode had a host material loading of about 6.5 mg/cm$^2$. FIG. 5 illustrates a microscopic top view of the second patterned electrode 502, showing an approximate channel size of about 34 μm, and an average host material columns 310 edge length E of about 0.5 mm. The first and second electrodes were then cycled (i.e., charged and discharged) for 70+ cycles to determine the respective specific capacity (mAh per gram of sulfur) for each electrode. The second patterned electrode 502 exhibited significantly higher specific capacity and, accordingly, sulfur utilization, than the first un-patterned electrode 501. Therefore, method 300 can be utilized to form a battery cell 10 having a higher capacity while using less material (e.g., host material 13) and decreasing the battery cell 10 weight.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for manufacturing a sulfur electrode, the method comprising: providing an electrode comprising: a current collector having a first surface, and a sulfur-based host material applied to the first surface of the current collector, wherein the sulfur-based host material comprises about 45% to about 80% by mass of one or more sulfur compounds, about 9% to about 45% by mass of one or more electrically conductive carbon materials, and about 2% to about 10% by mass of one or more binders; and forming a plurality of channels within the sulfur-based host material wherein the plurality of channels define a plurality of host material columns, each of the host material columns having one or more exterior surfaces contiguous with one or more of the channels which extend outward from the first surface of the current collector.

2. The method of claim 1, wherein forming the plurality of channels comprises forming a plurality of intersecting channels.

3. The method of claim 1, wherein the plurality of host material columns has an average current collector footprint diameter on the first surface of the current collector of less than about 1 millimeter.

4. The method of claim 1, wherein the plurality of channels has an average width of less than about 100 micrometers.

5. The method of claim 1, wherein each of the one or more exterior surfaces of each of the plurality of host material columns defines a heat affected zone which extends inward from the respective exterior surface and comprises a higher concentration of sulfur than the average concentration of sulfur of the respective host material column prior to forming the plurality of channels.

6. The method of claim 1, wherein forming the plurality of channels comprises forming channels which extend from a top surface of the sulfur-based host material to the first surface of the current collector.

7. The method of claim 1, wherein the host material of the sulfur electrode has a porosity of less than about 55%.

8. The method of claim 1, wherein the one or more sulfur compounds comprise sulfur, $S_8$, $Li_2S_8$, $Li_2S_6$, $Li_2S_4$, $Li_2S_2$, or $Li_2S$, and combinations thereof.

9. The method of claim 1, wherein the one or more electrically conductive carbon materials comprise conductive carbon black, high surface area carbon, including acetylene black or activated carbon, graphite, carbon nanotubes, carbon nanofiber, graphene, or vapor growth carbon fiber, and combinations thereof.

10. A method for manufacturing a sulfur electrode the method comprising: applying a sulfur-based host material to a first surface of a current collector, wherein the sulfur-based host material comprises about 45% to about 80% by mass of one or more sulfur compounds, about 9% to about 45% by mass of one or more electrically conductive carbon materials, and about 2% to about 10% by mass of one or more binders; forming a plurality of channels within the sulfur-based host material, wherein the plurality of channels define a plurality of host material columns, each of the host material columns having one or more exterior surfaces contiguous with one or more of the channels which extend outward from and are substantially normal to the first surface of the current collector; and trimming the current collector.

11. The method of claim 10, wherein applying the sulfur-based host material to the first surface of the current collector comprises: forming a host material slurry, applying the host material slurry to the first surface of the current collector, and solidifying the host material slurry.

12. The method of claim 10, further comprising applying the sulfur-based host material to a second surface of the current collector.

13. The method of claim 10, wherein the plurality of channels comprises a plurality of intersecting channels.

14. The method of claim 10, wherein the plurality of host material columns has an average current collector footprint diameter on the first surface of the current collector of less than about 1 millimeter.

15. The method of claim 10, wherein the plurality of channels has an average width of less than about 100 micrometers.

16. The method of claim 10, wherein each of the one or more exterior surfaces of each of the plurality of host material columns defines a heat affected zone which extends inward from the respective exterior surface and comprises a higher concentration of sulfur than the average concentration of sulfur of the respective host material column prior to forming the plurality of channels.

17. The method of claim 10, wherein the plurality of channels comprises channels which extend from a top surface of the sulfur-based host material to the first surface of the current collector.

18. The method of claim 10, wherein the one or more electrically conductive carbon materials comprise conductive carbon black, high surface area carbon, including acetylene black or activated carbon, graphite, carbon nanotubes, carbon nanofiber, graphene, or vapor growth carbon fiber, and combinations thereof.

19. The method of claim 1, wherein the plurality of channels is formed using a laser or an electron beam.

20. The method of claim 10, wherein the plurality of channels is formed using a laser or an electron beam.

* * * * *